United States Patent [19]

Süess

[11] Patent Number: 5,441,793
[45] Date of Patent: Aug. 15, 1995

[54] ORDERLY PACKING FOR A COLUMN

[75] Inventor: Philipp Süess, Neftenbach, Switzerland

[73] Assignee: Sulzer Chemtech AG, Winterthur, Switzerland

[21] Appl. No.: 201,434

[22] Filed: Feb. 24, 1994

[30] Foreign Application Priority Data

Mar. 10, 1993 [EP] European Pat. Off. ............ 93810177

[51] Int. Cl.6 ..................... B32B 23/02; B32B 3/28; B01D 47/00
[52] U.S. Cl. ..................... 428/192; 428/182; 428/184; 428/212; 261/112.2; 261/DIG. 72
[58] Field of Search ............... 428/182, 174, 184, 192, 428/212, 33, 59, 102, 105; 261/112, 2, DIG. 72

[56] References Cited

U.S. PATENT DOCUMENTS 4,186,159 1/1980 Huber .................. 261/112.2
4,915,878 4/1990 György ................ 261/112.2

Primary Examiner—Donald J. Loney
Attorney, Agent, or Firm—Townsend and Townsend Khourie and Crew

[57] ABSTRACT

The orderly packing for a column for mass transfer between a trickling film (14) and a gas is made of alternately arranged layers (10, 20) of undulating foil material. Some of the layers (10) steer the trickling film towards one vertical edge (13) of the layers while the other layers (20) steer the trickling film away from that edge. Pairs of invention the layers are coupled by redirector elements (3) which form a liquid-conducting bridging-over to transfer edge-seeking liquid (15) on the one layer (10) at least partially to the associated neighboring layer (20).

12 Claims, 3 Drawing Sheets

ORDERLY PACKING FOR A COLUMN

BACKGROUND OF THE INVENTION

The invention refers to an orderly packing for a column as well as to a mass transfer column with such a packing.

The packing is composed, for example, of layers of sheets folded in the form of waves or zigzags. The sheets consist of a foil-like material (e.g., of thin sheet-metal or fabric); the edges of the folds or the crests exhibit a direction inclined to the axis of the column, the angle included with the axis amounting, for example, to 45° or 30°. The layers formed by the sheets are aligned in parallel with the axis; they are arranged alternately as regards the slope of the edges of the folds, so that open channels running obliquely and crossing one another result. The packing is composed of sections which differ in the orientation of the layering. Between adjacent sections the orientation changes each time through 90°.

Further examples of orderly packings which cause a distribution of the two mass flows over the cross-section of the column are described in the European patent specifications 0 070 917 and 0 069 241.

At the vertical edges of the packing some of the alternately arranged layers steer the trickling film towards the edges of the sheets as it flows over the sheets, which leads to the phenomenon of an edge-seeking liquid. The practice is known of providing between the sections of packing at the wall of the column, elements like crowns which guide the edge-seeking liquid round in such a way that it partially over the layers steering it inwards—flows back again into the interior of the packing. From the U.S. Pat. No. 4,186,159 or Swiss patent 618 006 elements of that kind are known, in the form of collars which may be arranged at various heights on the sections of packing.

One individual section of packing of the mass transfer column may consist of a cohesive insert element; it may—especially in the case of a large diameter of the column—also be composed of a number of segments. In that case the packing often also exhibits in the interior, parting planes which run transversely to the layers; that is, junctions between adjacent segments. These parting planes interrupt the channels and exercise an edge effect because of which edge-seeking liquid also arises at the junctions.

For the junctions no means are known for avoiding or returning edge-seeking liquid; means of that kind for the edge of the column—such, for example, as collars—exhibit a very restricted efficiency.

SUMMARY OF THE INVENTION

It is therefore an object of the invention to create means by which edge-seeking liquid may be effectively returned into the packing or respectively into the segments of packing.

First experiments with corrugated strips of foil which were fitted to the edge of the packing have shown that by these strips edge-seeking liquid may be effectively steered away from the edge of the sheets. But in order that the liquid steered away may also be transferred to the adjacent sheet additional measures are necessary. For example, by sealing elements which stop the flow of liquid along the strips, the liquid could be steered into the layers with the returning channels. Another and more advantageous possibility is provided by strips of angular form.

DESCRIPTION OF THE PREFERRED EMBODIMENTS

Figure 1:
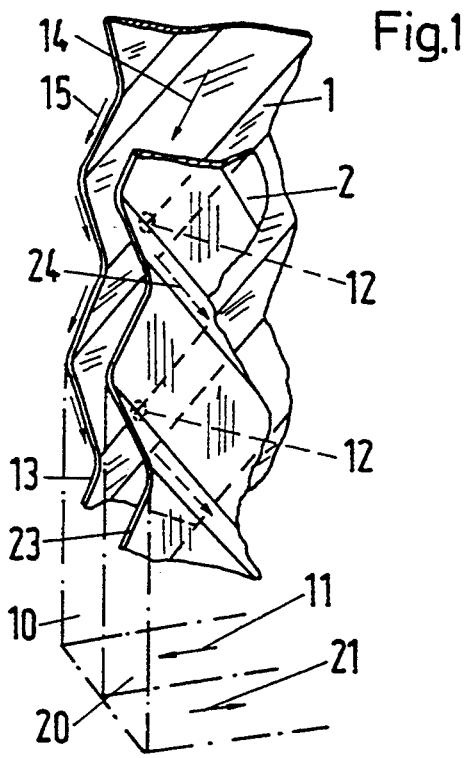
FIG. 1 is a detail of a packing in perspective (without redirector elements)

The detail from a packing in FIG. 1 consists of the corrugated sheets 1 and 2 which touch at the points 12.

A trickling film 14 is flowing down the sheet 1 and flows on down the vertical edge 13 in the form of an edge-seeking liquid 15. The sheet 1 forms the layer 10 indicated in dash dot line; the arrow 11 specifies the direction into which the trickling film is steered. If means are present which take care of a transfer of the edge-seeking liquid 15 onto the adjacent sheet 2, the transferred liquid 24 is steered by the layer 20 away from the edge 23 back into the interior of the packing (arrow 21).

Figure 2:
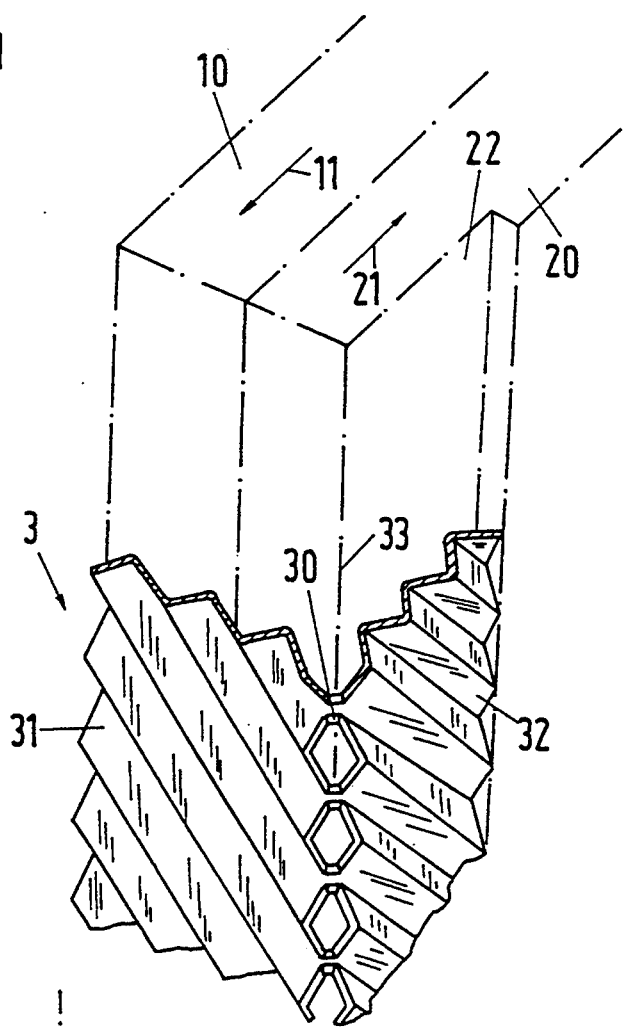
FIG. 2 is a first embodiment of the redirector element of the packing in accordance with invention.

The redirector element 3 in the form of a strip as shown in FIG. 2 consists of a corrugated foil-like material. It is made angular: the two arms 31 and 32 include a right angle at the vertical line 33. The arm 31 is in contact with the edge of the packing layer 10 carrying the edge-seeking liquid. The arm 32 points in the direction of the plane of the layer 20. A recess 22 is provided in this layer 20 for the arm 32. In the present embodiment the two arms are connected by bridgelike connector pieces 30 which form a liquid-conducting bridging-over. This redirector element 3 may be produced in a way corresponding with that explained later on in connection with FIGS. 5 and 6.

In a successfully performed experiment the following values had been chosen for the geometrical dimensions: wavelength of the packing=25 mm, width of layer=25 mm; wavelength of the redirector element 3=7.5 mm, depth of the waves=3 mm, length of the arm 31=25 mm, length of the arm 32=30 mm, and inclination of the crest of the wave=25°. The charging speed was about 60 m/h ($m^3/m^2h$).

An important effect of the redirector element is achieved if the redirector elements are given a relatively fine profile: wavelength about 1 mm, depth of the waves about 0.5 mm. For the inclination of the crests of the waves practically any value is possible which is greater than 0° and less than about 60°; preferably an angle less than 45° is chosen.

Figure 3:
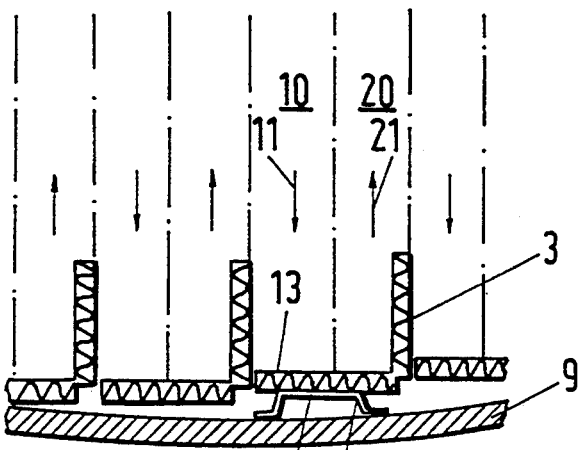
FIG. 3 is a cross-section through an edge region of a column having redirector elements according to FIG. 2.
Figure 4:
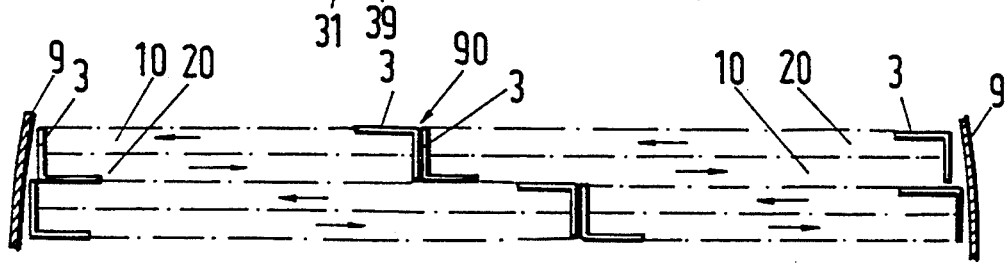
FIG. 4 is one part of a cross-section of a column with redirector elements at junctions between packing segments.

FIG. 3 shows an arrangement of layers 10, 20 in the packing, with associated redirector elements 3 at the column wall 9. By means of spring elements 39 between the packing and the column wall the redirector element 3, for example, may be pressed against the edge 13 of the layer 10. But the redirector elements 3 may also be fastened to the packing by means of welded, screwed or riveted connections. Besides showing redirector elements 3 at the edge of the column, FIG. 4 shows in addition those elements 3 which lie at junctions 90 between segments of the packing in the interior of the packing.

It is of advantage if the arm 31 is a little shorter than the width of the layer 10. Then for a flow of gas moving between the wall 9 of the column and the packing, essentially no obstruction exists in respect of a possible flowing back into the interior of the packing.

Figure 5:
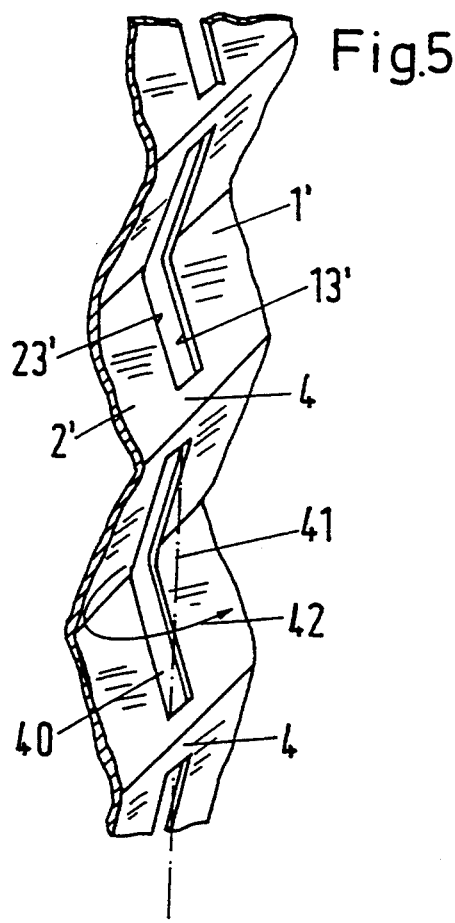
FIG. 5 is a corrugated packing sheet with a groove-like recess.
Figure 6:
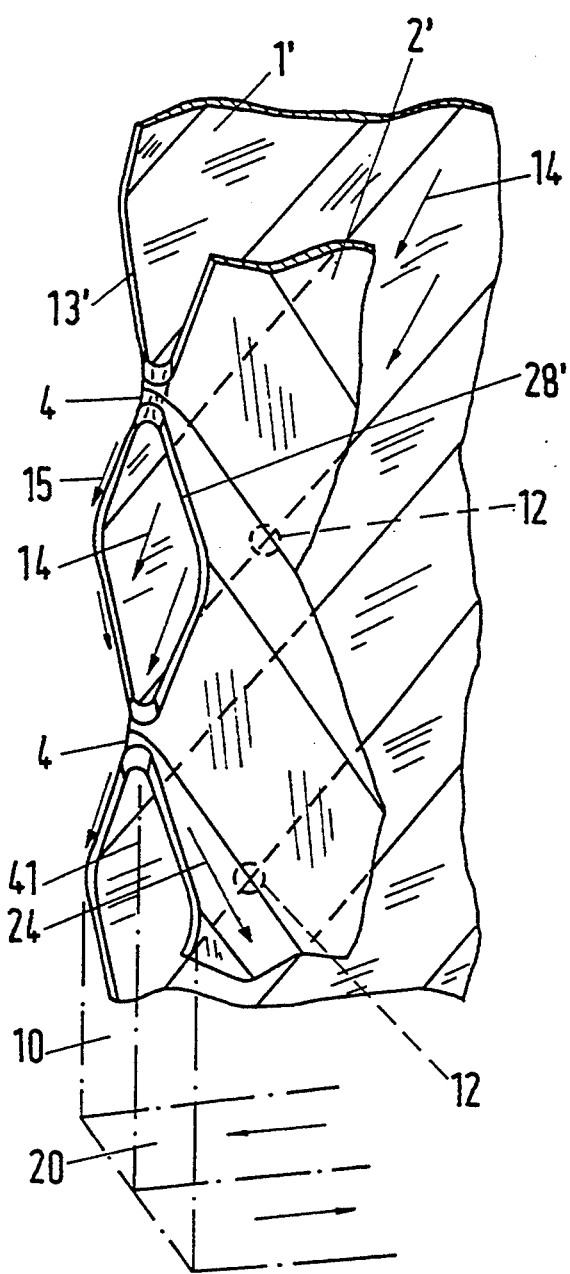
FIG. 6 is one edge of a packing which is produced through folding the sheet shown in FIG. 5.

In FIG. 5 a detail of a corrugated foil is shown which is sub-divided by a groovelike recess 40 into two parts 1' and 2'. The two parts are connected at the points 4 like a bridge. By folding about the axis 41 in accordance with the arrow 42 the two-layered structure of FIG. 6 is obtained (or matching the redirector element 3 shown in FIG. 2). It is folded through 180° so that the two parts 1' and 2' touch at the points 12. (In the case of the corresponding production of the redirector element 3 it is obviously folded through merely 90°).

In the case of the pair of layers 10, 20 shown in FIG. 6 the redirector elements are formed in the shape of connections 4 which produce between the edges 13' and 23' of the sheets 1' and 2'; respectively, solid bridgings-over. The edge-seeking liquid 15 of the trickling film 14 is guided back into the packing again by these redirector elements 4 (arrow 24).

For a satisfactory return of the edge-seeking liquid 15 it is important that the connections 4 are as wide as possible. Consequently the recess 40 (FIG. 5) must only be just as deep as is necessary for the folding round.

Figure 7:
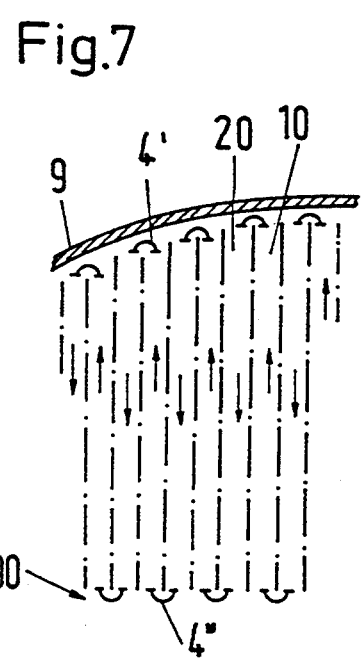
FIG. 7 is one part of a cross-section of a column with a packing which is produced through multiple folding—corresponding with FIG. 6.

According to the folding method of FIG. 5 a plurality of pieces of sheet may also be folded together into a multi-layered packing segment. This is illustrated with the aid of FIG. 7. The arcs 4' (at the column wall 9) and 4" (at a junction 90) symbolize redirector elements 4 in accordance with FIG. 6.

Figure 8:
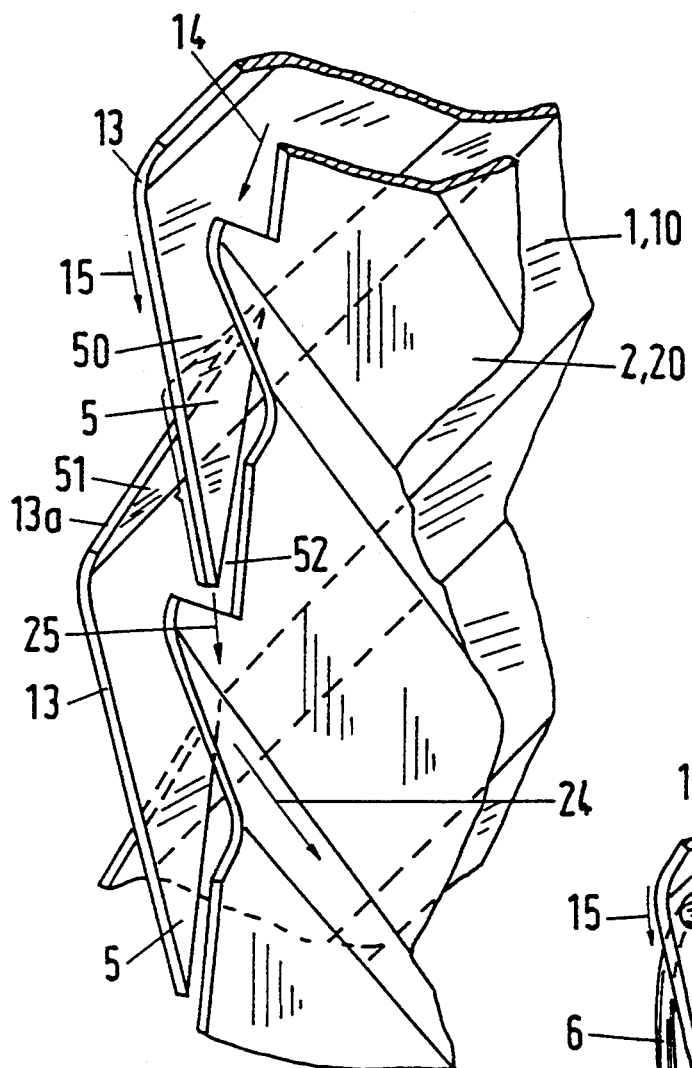
FIG. 8 is one edge of a packing with zigzag lobes as redirector elements.

FIG. 8 shows as a detail the edge region of a pair of sheets 1, 2 at which the redirector elements at the edge of the layer 10 which is carrying the edge-seeking liquid 15 are made in the form of zigzag lobes 5. These lobes 5 result from cutting obliquely into the edge 13 of the sheet 1 (cut edge 13a) and folding back the piece identified by a curved bracket 51 about the line 50. At the edge of the sheet 2 recesses 25 are provided for the zigzag lobes 5 so that the edge-seeking liquid 25 may pass over into the neighboring layer 20 (arrow 24) unimpeded.

Figure 9:
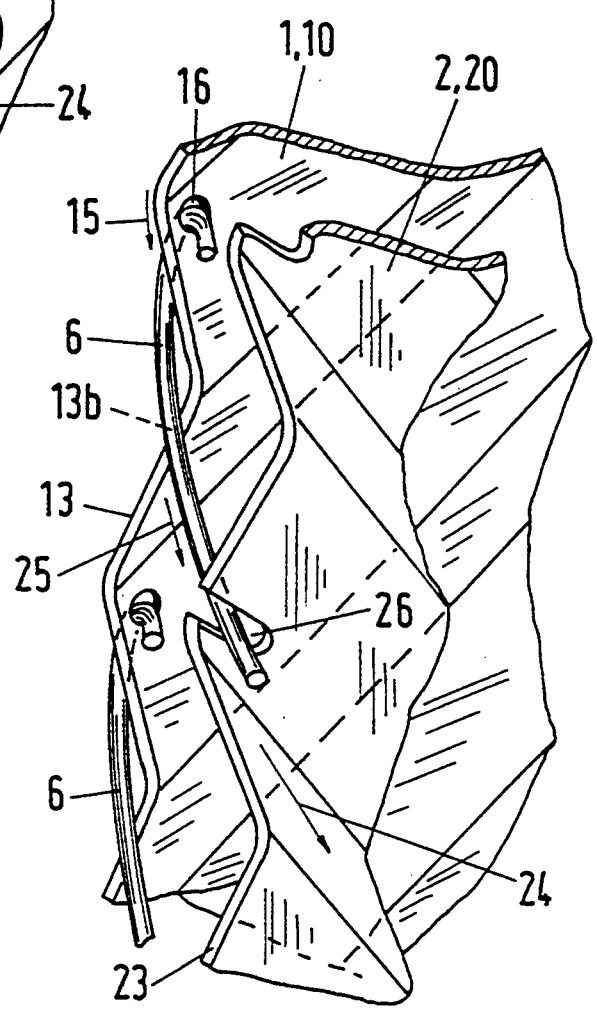
FIG. 9 is one edge of a packing with redirector elements in the form of wire.

In the case of the embodiment of FIG. 9 the redirector elements consist of pieces of wire 6. These redirector elements 6 in the form of wire exhibit on the one hand an end in the form of a hook by which they may be suspended in holes 16 in the sheet 1; on the other hand they are shaped in such a way that they touch (point 136) the edge 13 of the sheet. At the edge 23 of the sheet 2 recesses 26 in the form of a groove are provided for the bottom ends of the pieces of wire 6. At the point 136 the edge-seeking liquid 15 from the layer 10 is guided round towards and into the associated neighboring layer 20 (arrows 25, 24). In the event that the capacity of return of the pieces of wire 6 is too low, instead of one single piece of wire per wavelength two or more may also be provided.

What is claimed is:

1. An orderly packing for a column for mass transfer between a trickling film (14) and a gas, comprising alternately arranged layers (10, 20), first layers (10) being adapted to steer the trickling film towards a vertical edge (13) of the layers and second layers (20) being adapted to steer the trickling film away from the edge, redirector elements forming liquid guiding surfaces fluidly coupling the first and second layers and transferring edge-seeking liquid (15) flowing on the first layer (10) at least partially to the second layer (20).

2. A column packing as in claim 1, wherein the redirector elements (3) each comprise a strip which is formed at an angle by a vertical line to define first and second arms and includes a corrugated foil material, the first layer (10) of the packing over which the edge-seeking liquid (15) flows being in contact with the first arm (31) of the redirector element and the second layer (20) touching the second arm (32).

3. A column packing as in claim 2, wherein the corrugated foil material comprises a profiling having a wavelength of between about 1 and 10 mm and a wave depth of between about 0.5 and 5 mm, an inclination of wavecrests of the redirector elements (3) being greater than 0° and less than 45°.

4. A column packing as in claim 2, including a recess (22) in the second layer (20) of the packing for the second arm (32) of the redirector element (3).

5. A column packing as in claim 1, wherein the redirector elements (3) comprise connections (4) forming solid bridge-overs between adjoining edges (13', 23') of respective pairs (1', 2') of layers.

6. A column packing as in claim 5, wherein at least parts of the packing are made from corrugated foil material folded about vertical recesses (40) forming recessed base webs (4) which act as redirector elements.

7. A column packing as in claim 1, wherein the redirector elements form jagged lobes (51) at an edge (13) of the first layer (10) carrying the edge-seeking liquid (15) and transferring the edge-seeking liquid to the second layer (20), recesses (52) being provided at an edge of the second layer for the jagged lobes.

8. A column packing as in claim 1, wherein the redirector elements comprise pieces (6) of wire touching an edge (13, 136) of the first layer (10) carrying the edge-seeking liquid (15) and transferring the edge-seeking liquid to the second layer (20), recesses being provided at an edge (23) of the second layer for the pieces of wire.

9. A column packing as in claim 1, wherein the redirector elements (3) and the layers of the packing comprise substantially the same metallic alloy.

10. A mass transfer column for mass transfer between a trickling film and a gas, comprising alternately arranged first and second layers, the first layers being adapted to steer the trickling film towards a vertical edge of the layers and the second layers being adapted to steer the trickling film away from the edge, redirector elements forming liquid guiding surfaces fluidly coupling cooperating pairs of the first and second layers and transferring edge-seeking liquid flowing on the first layer at least partially to the second layer, at least some of the redirector elements forming edges of the layers which form outer edges of the column.

11. A mass transfer column according to claim 10, wherein at least some of the redirector elements (3)

form intersections (90) between adjacent segments of the packing located inside the column.

12. A mass transfer column as in claim 10 wherein the redirector element comprises first and second transverse arms, and including spring elements (39) between the wall (9) of the column and the redirector elements (3) for biasing the first arm (31) against the edge (13) of the layer (10) along which the edge-seeking liquid (15) flows.

* * * * *